US012639161B2

(12) United States Patent
Mink et al.

(10) Patent No.: US 12,639,161 B2
(45) Date of Patent: May 26, 2026

(54) DISTRIBUTED ERROR CORRECTION CODE FOR EDGE DEVICE MACHINE LEARNING MODELS

(71) Applicant: DELL PRODUCTS L.P., Round Rock, TX (US)

(72) Inventors: Jacob Mink, Cedar Park, TX (US); Balasingh Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/910,387

(22) Filed: Oct. 9, 2024

(65) Prior Publication Data

US 2026/0099401 A1     Apr. 9, 2026

(51) Int. Cl.
| | |
|---|---|
| *G06F 11/00* | (2006.01) |
| *G06F 8/70* | (2018.01) |
| *G06F 11/08* | (2006.01) |

(52) U.S. Cl.
CPC .............. *G06F 11/08* (2013.01); *G06F 8/70* (2013.01)

(58) Field of Classification Search
CPC .... G06F 11/10; G06F 11/0751; G06F 11/076; G06F 11/004; G06F 11/08; G06F 11/36; G06F 11/3668; G06F 8/70; G06F 8/71; G06F 21/57
See application file for complete search history.

(56) References Cited

U.S. PATENT DOCUMENTS

| | | | |
|---|---|---|---|
| 11,314,866 B2 | 4/2022 | Brown et al. | |
| 2010/0192029 A1 | 7/2010 | Wang et al. | |
| 2020/0233936 A1* | 7/2020 | Veshchikov | ........ G06F 18/2155 |
| 2021/0232981 A1* | 7/2021 | Sundaresan | ......... H04L 63/0823 |
| 2021/0319174 A1* | 10/2021 | Raj | ....................... G06F 40/242 |
| 2023/0334344 A1* | 10/2023 | Almasan | ............. G06F 16/2255 |
| 2025/0278308 A1* | 9/2025 | Nair | ................. G06Q 10/06311 |

OTHER PUBLICATIONS

Jeong, Jinwoo et al., Lightweight Error Correction for In-Storage Acceleration of Large Language Model Inference, 2024, IEEE (Year: 2024).*
Cui, Guangming et al., Efficient Verification of Edge Data Integrity in Edge Computing Environment, 2022, IEEE (Year: 2022).*

* cited by examiner

*Primary Examiner* — Marc Duncan
(74) *Attorney, Agent, or Firm* — Larson Newman, LLP

(57) ABSTRACT

An information handling system that includes a processor and a memory coupled to the processor, the memory having program instructions stored thereon that upon execution cause the processor to determine a last audit date of a machine learning model, such as a language model in response to detecting a connection to an edge device. The execution of the program instructions may also cause the processor to determine whether the last audit date exceeds an audit threshold and apply an error correction code to the language model in response to a determination that the last audit date exceeds the audit threshold.

20 Claims, 3 Drawing Sheets

200

300

Information Handling System

302 Processor

304 Processor

334 Video Display

320 Memory

322

310 306

Chipset

308

332

330 336 Graphics Interface

312

340 NVRAM
342 BIOS/ EFI

392

370 I/O Interface

350 Disk Controller

356

352

376 TPM

380 Network Interface

374 Add-On Resource

372

382

354

360 Disk Emulator

390 BMC

394

364 362

Solid State Drive

DISTRIBUTED ERROR CORRECTION CODE FOR EDGE DEVICE MACHINE LEARNING MODELS

FIELD OF THE DISCLOSURE

The present disclosure generally relates to information handling systems, and more particularly relates to a distributed error correction code for edge device machine learning models.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system that includes a processor and a memory coupled to the processor, the memory having program instructions stored thereon that upon execution cause the processor to determine a last audit date of a machine learning model, such as a language model in response to detecting a connection to an edge device. The execution of the program instructions may also cause the processor to determine whether the last audit date exceeds an audit threshold and apply an error correction code to the language model in response to a determination that the last audit date exceeds the audit threshold.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

There is a current trend of using a machine learning model, such as a language model, such as a small language model (SLM), a large language model (LLM), or similar in applications and services. For example, artificial intelligence (AI) applications can train and fine-tune a language model to perform a variety of tasks, like text classification and answering questions. In one particular example, an organization may utilize an SLM or an LLM that is tuned to answer questions by staff regarding desk hardware issues. As such, the dependability of the language model being utilized is of paramount importance.

In a distributed computing environment, a single user's AI workloads may execute locally on the user's information handling system or execute remotely on another information handling system or computing device. When a user is working on their computer, the latency of the AI workload may be too high to feasibly run the AI workload locally. If the user is connected to an edge device, such as a local external computer, that can be the next best place to run the workload. As such, an information technology decision maker (ITDM) may decide to store the language model used in the execution of the AI workload at the edge device to optimize the execution of the AI workload.

A language model includes a large number of parameters, such as weights and tokens that the language model collects and adjusts during its training and fine-tuning. During training, the language models may conduct mathematical equations to discover relationships between the tokens, which can be represented by the weights. When data is stored for long term, the data can be susceptible to an n-bit error at rest due to random electrical noise over time. In one embodiment, the data may be stored for a long term, when the data is stored for at least a year. The n-bit error can have a catastrophic effect on an output of the language model by changing the output with no indication of issues to the user. For example, there may be issues with tokens returned by the language model that would result in the output of the language model that does not make sense. Thus, it is advantageous to detect and/or correct the n-bit error before the output of the language model is affected. Accordingly, the present disclosure provides a system and method to protect the language model by applying an error correction code (ECC) periodically.

Figure 1:
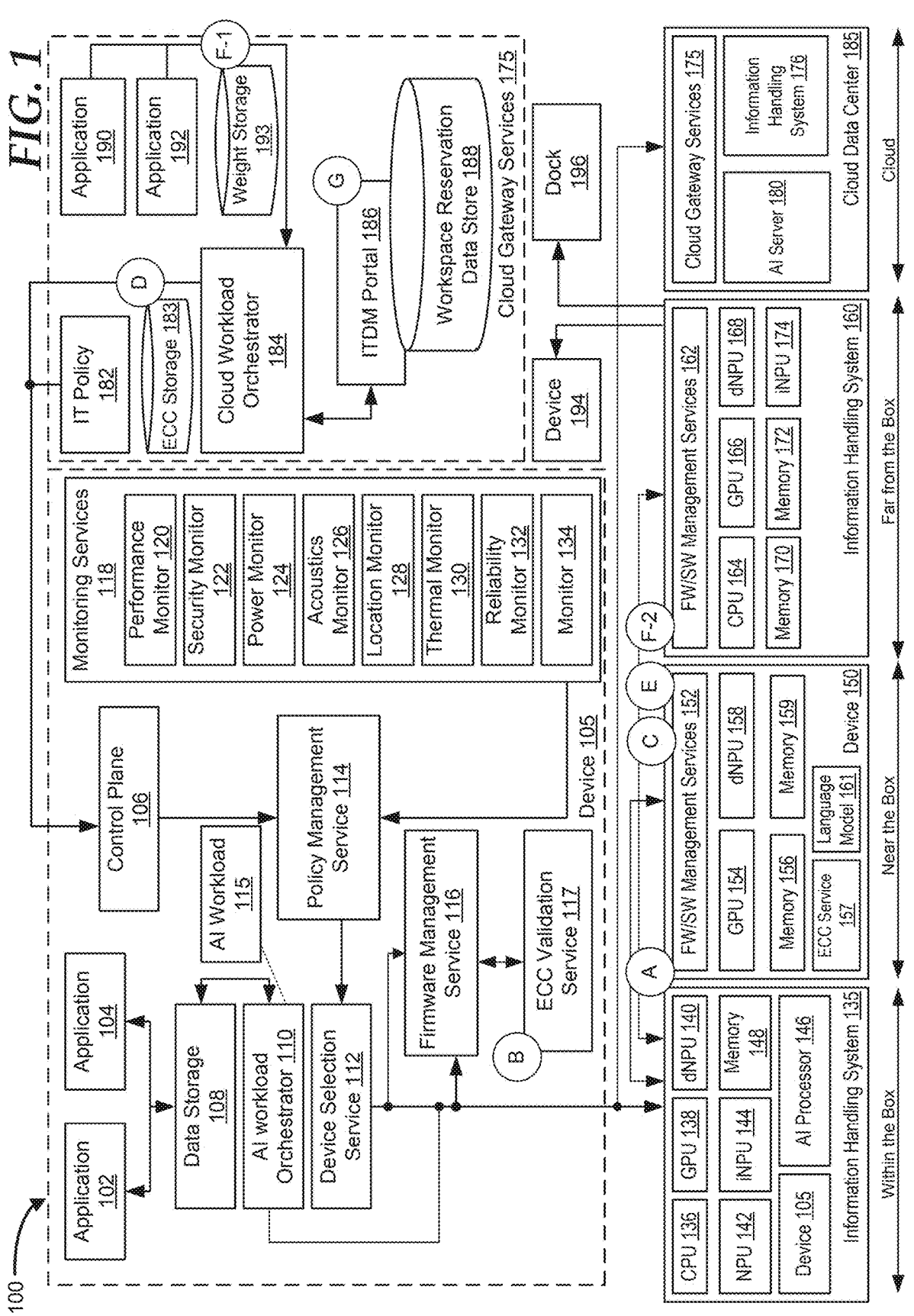
FIG. 1 is a block diagram of a distributed system of information handling systems, according to an embodiment of the present disclosure.

FIG. 1 illustrates a portion of a distributed system environment 100 for distributed ECC for a machine learning model that is stored in an edge device, according to an embodiment of the present disclosure. Distributed system environment 100 includes a set of communicatively coupled information handling systems or compute devices, such as information handling systems 135 and 160, a device 150, and a cloud data center 185. Local and remote information handling systems in distributed system environment 100 may be communicatively linked either by hardwired data links, wireless data links, or a combination of hardwired and wireless data links through a network.

The network may be a public network, such as the Internet, a physical private network, a wireless network, a virtual private network, or any combination thereof. The network may be implemented as or may be implemented as or may be a part of, a storage area network, a personal area network, a local area network, a metropolitan area network, a wide area network, a wireless local area network, an intranet, or any other appropriate architecture or system that facilitates the communication of signals, data, and/or messages.

Information handling systems generally process, compile, store, and/or communicate information or data for business, personal, or other purposes thereby allowing users to take advantage of the value of the information. Nevertheless, a continually growing number of information handling systems and devices are being enhanced with AI services, such as heuristic learning, machine learning, deep learning, reinforcement learning services, and the like. Currently, most AI services are performed in central processing units (CPUs), graphics processing units (GPUs), system on chips (SOCs), neural processing units (NPUs), or other processors of the information handling system.

As the number of AI services increases, so will the need for computing resources to execute machine learning or AI models. Nevertheless, executing AI services in the information handling system, such as on-the-box (OTB) can inadvertently affect end-user productivity and negatively exhibit adverse effects, such as reduced battery life, system performance, and overall end-user experience. Conventional techniques to address this problem include AI hardware accelerators and AI software accelerators. However, these accelerators can be busy performing other tasks. In addition, these accelerators can be expensive and thus may not get integrated into low-cost platforms. Accordingly, embodiments of the present disclosure provide a system and method for preemptive and secure transitioning of AI workload to a premium information handling system, such as a dock using workspace reservation information.

Figure 3:
FIG. 3 is a block diagram of an information handling system, according to an embodiment of the present disclosure.

Information handling system 135, which is similar to information handling system 300 of FIG. 3 may be a personal computer, a desktop computer system, a laptop computer system, a server computer system, a mobile device, a tablet computing device, a personal digital assistant, a consumer electronic device, an electronic music player, an electronic camera, an electronic video player, a wireless access point, a network storage device, or any other suitable computing device. Information handling system 135 may also be a portable information handling system that may include a laptop, a notebook, a smartphone, a tablet, or a personal digital assistant, among others. In one example, information handling system 135 may be an employee's corporate laptop that he or she docks into device 150 upon arrival at the office. The employee may also dock information handling system 135 into a docking station at his or her home.

Information handling system 135 may be communicatively coupled to device 150 and information handling system 160. Information handling system 135 may also be communicatively coupled to cloud data center 185 via the Internet. In this example, information handling system 160 is communicatively coupled with a device 194 and a dock

196. Device 194 may be similar to device 105 while dock 196 may be similar to device 150. However, any variety of connections between various components of distributed system environment 100, such as connections between information handling systems 135 and 160, devices 105 and 194, and dock 196 with cloud data center 185 are envisioned as falling within the scope of the present disclosure. In addition, connections between components and within the various components of distributed system environment 100 are also envisioned as falling within the scope of the present disclosure. In addition, connections between components and within the various components may be omitted for descriptive clarity.

Information handling system 135 includes a device 105, a CPU 136, a GPU 138, a discrete NPU (dNPU) 140, an NPU 142, an integrated NPU (iNPU) 144, an AI processor 146, and a memory 148. Device 105 includes applications 102 and 104, a control plane 106, a data storage 108, an artificial intelligence (AI) workload orchestrator 110, a device selection service 112, a policy management service 114, a firmware management service 116, an ECC validation service 117, and a monitoring service 118.

CPU 136, which is similar to processors 302 and 304 of FIG. 3, may be configured to execute instructions of an application, such as applications 102 and 104. CPU 136 may also be configured to execute instructions associated with AI workload orchestrator 110, device selection service 112, policy management service 114, and firmware management service 116. In addition, CPU 136 along with GPU 138, dNPU 140, NPU 142, INPU 144, and AI processor 146 may be configured to execute an AI workload, such as AI workload 115.

GPU 138, which may be similar to a graphics adapter 330 of FIG. 3 may comprise any system, device, or apparatus configured to process graphical or visual content and to communicate that content to a monitor or display where the content may be rendered. An NPU may comprise any system, device, or apparatus, such as a hardware accelerator that is designed for AI and ML tasks. NPUs are optimized to handle the complex computations required by deep learning algorithms. This optimization makes NPUs efficient at processing AI tasks, such as natural language processing, image analysis, and more. NPUs utilized by information handling system 135 may be of various types including dNPU 158, INPU 144, and AI processor 146. DNPU may be a discrete NPU, such as an NPU in a USB stick. An NPU may also be integrated with information handling system 135. INPU 144 may be connected via an m.2 slot within information handling system 135. AI processor 146 may comprise any system, device, or apparatus configured to process AI workloads.

Memory 148, which is similar to a memory 320 of FIG. 3, may comprise a non-volatile memory accessible by CPU 136, GPU 138, dNPU 140, NPU 142, INPU 144, device 105, or AI processor 146. However, each one of the aforementioned may be associated with a separate non-volatile memory device. Memory 148 may include a static random access memory (SRAM), a dynamic random access memory (DRAM), or any suitable device to support high-speed memory operations. In certain embodiments, memory 148 may combine both persistent, non-volatile memory and volatile memory. In certain embodiments, memory 148 may include multiple removable memory modules.

Device 105 may comprise any system, device, or apparatus configured to host control plane 106, data storage 108, AI workload orchestrator 110, device selection service 112, policy management service 114, firmware management service 116, and applications 102 and 104. Applications 102 and 104 are applications installed locally on device 105, also referred to as on-the-box (OTB) applications. For example, application 102 may be a video telephony software program while application 104 may be a natural language processing application.

Control plane 106 may be configured to control or route data received from cloud gateway services 175 to one or more components of information handling system 135, such as policy management service 114. In one example, control plane 106 may route IT policy 182 to device selection service 112. Data storage 108 may be a persistent data storage device. Data storage 108 may include solid-state disks, hard disk drives, magnetic tape libraries, optical disk drives, magneto-optical disk drives, compact disk drives, compact disk arrays, disk array controllers, and/or any computer-readable medium operable to store data. Data storage 108 may include a database or a collection of files that is a central repository of data associated with workloads that are accessible by AI workload orchestrator 110 and applications 102 and 104. For example, AI workload orchestrator 110 and applications 102 and 104 may retrieve, store, and utilize data stored in data storage 108.

AI workload orchestrator 110 may be configured to monitor, control, and/or manage AI workloads instantiated using a CPU, GPU, NPU, or similar, such as AI workload 115. AI workload 115 generally refers to data associated with an AI service that is to be performed to generate one or more inferences based on the data. For example, AI workload 115 may include a set of input data, such as telemetry data, past profile recommendations, machine learning hints from other AI services, etc., that may be processed to generate one or more inferences. As such, AI workload 115 may include machine learning and deep learning workloads, such as tasks performed by AI systems which typically involve processing large amounts of data and performing complex computations.

For example, a typical machine learning workflow may include building a model from a sample dataset, evaluating the model against one or more additional sample datasets to decide whether to keep the model and to benchmark how good the model is, using the model in production to make predictions or decisions against live input data captured by an application. The training set, validation set, and/or test set can respectively include pairs of input datasets and output datasets that correspond to the respective input datasets.

Device selection service 112 may comprise any system, device, or apparatus configured to determine a physical and/or virtual device or information handling system to process or transition an AI workload according to a policy, such as IT policy 182. For example, device selection service 112 may determine whether to transition AI workload 115 to a trusted device or information handling system within distributed system environment 100 that includes an AI processor capable of executing an AI workload. An AI processor includes a GPU, CPU, NPU, dNPU, INPU, or similar that is capable of executing an AI workload. Typically, an OTB AI processor is prioritized over a "near the box" device or information handling system. However, the "near the box" device or information handling system is generally prioritized over a "far from the box" device or information handling system. Accordingly, the "far from the box" AI processor or information handling system is generally prioritized over a cloud resource.

Device selection service 112 and/or AI workload orchestrator 110 may gather data or information from monitoring services 118 or its components. The data or information may include current performance, power utilization, and acoustic and thermal levels, among others to characterize the current state or utilization of one or more components of information handling system 135. This information may be utilized to determine whether to offload AI workloads according to policy, such as IT policy 182 provided by policy management service 114. Policy management service 114 may comprise any system, device, or apparatus configured to manage, monitor, and/or control IT policies, such as policies associated with AI workload transitions.

Firmware management service 116 may comprise any system, device, or apparatus configured to communicate with relevant hardware post-device selection. For example, firmware management service 116 may interface with a specific vendor application programming interface (API) to an OTB hardware, to a hardware connected to information handling system 135, or it may pass through to external components in order to run the workload.

ECC validation service 117 may comprise any system, device, or apparatus configured to detect an error in one or more language models stored in an edge peripheral device or an edge device, such as device 150. For example, an ECC may be executed on a portion of a memory storing the language models to detect an error, such as an n-bit error associated with the memory. If an error is detected, the ECC may be used to fix the error. ECC validation service 117 can also trigger a re-download of a set of language model weights, also referred to herein simply as weights, from an ECC storage 183 to fix the error.

In one embodiment, ECC validation service 117 may be executed by a dedicated processor, CPU 136, GPU 138, or similar. In addition, ECC validation service 117 may communicate with FW/SW management services 152 and/or an ECC service 157 via a communication protocol over a physical connection or a side band channel of an embedded controller. ECC validation service 117 and/or ECC service 157 may identify an audit registry that stores audit information associated with a protected portion of language model 161. The audit registry may be a data structure, such as a table, a database, or similar. The protected portion(s) of language model 161 may be portions that may be periodically audited and detected errors fixed. The ITDM may determine which portions of a language model to protect. The ITDM may also protect the entire language model.

Monitoring services 118 may be configured to monitor, control, and/or manage one or more features of information handling system 135 and/or device 105, such as the health and performance of device 105. As such, monitoring service 118 includes one or more monitoring services, wherein each monitoring service may monitor, control, and/or manage a feature of device 105. For example, monitoring service 118 includes a performance monitor 120, a security monitor 122, a power monitor 124, an acoustics monitor 126, a location monitor 128, a thermal monitor 130, a reliability monitor 132, and monitor 134. Monitoring services 118 can include other monitors or monitoring services than depicted herein as new information becomes available to information handling system 135 and/or monitoring services 118.

Performance monitor 120 may be configured to monitor, manage, and/or control the performance of device 105 and/or its components. For example, performance monitor 120 can collect performance metrics over time, at specified intervals, and generate logs that can be analyzed to identify system performance issues. Security monitor 122 may be configured to monitor, manage, and/or control security of device 105 and/or its components. For example, security monitor 122 can detect a security data threat with data associated with AI workload. Power monitor 124 may be configured to monitor, manage, and/or control power consumption of device 105 and/or its components. For example, power monitor 124 may determine the power consumption of each one of applications 102 and 104. Acoustics monitor 126 may be configured to monitor, manage, and/or control the acoustics level of device 105 and/or its components. For example, acoustics monitor 126 may provide a current acoustics level to performance monitor 120.

Location monitor 128 may comprise any system, device, or apparatus configured to determine the location and movement of information handling system 135, such as based on triangulation of network information or information accessible via the operating system, or a location subsystem, such as a global positioning system (GPS) module. Thermal monitor 130 may be configured to monitor, manage, and/or control thermal level of device 105 and/or its components. For example, thermal monitor 130 may receive temperature information from one or more temperature sensors. In addition, thermal monitor 130 may provide a current thermal level to performance monitor 120.

Reliability monitor 132 may comprise any system, device, or apparatus configured to monitor, manage, and/or control hardware or software issues that may affect the performance and reliability of information handling system 135. Monitor 134 may comprise any system, device, or apparatus configured to determine other information to be utilized by monitoring services 118 during the monitoring, managing, and/or controlling information handling system 135 and/or its components. For example, monitor 134 may be configured to support proximity sensors, including optical, infrared, and/or sonar sensors, which may be configured to provide an indication of a user's presence near information handling system 135, absence from information handling system 135, and/or distance from information handling system 135, such as near-field, mid-field, or far-field.

In general, computer networks are considered to be trusted according to the following rules: a. by default, provisioned information handling systems under the purview of an organization's information technology (IT) department are trusted by each other for many corporate information handling system users, and by default multiple systems registered with the same account are considered to be trusted for non-corporate users. IT administrators have the ability to create smaller groups within their organization, such as engineering laptops workstations, desktop computers, and based on the organization's policy on potential data sharing. Additionally, AI workload processes may consume a relatively large amount of processing resources, yet the results they provide often do not require instantaneous implementation, such as other process-intensive services. On certain conditions and based on the local resources, it could otherwise be better to send the data to another device or a trusted information handling system within an organization group with the capability to perform AI workloads, such as devices with "premium" AI capabilities like device 150. A premium device may include a dock, an M.2 connected NPU, a webcam, or similar that includes an AI processor.

Device 150 may be referred to as a "premium" edge device with AI processing capabilities that can be utilized to process an AI workload, such as a firmware/software (FW/SW) service 152, a GPU 154, a dNPU 158, and memories 156 and 159. Device 150 may be a dock or docking station with long-term storage for a machine learning or AI language model, such as language model 161. Device 150 may also be configured to protect language model 161 from error via ECC service 157.

Information handling system 135 can be connected to device 150 via a wired connection or a short-range wireless connection like Bluetooth®, Wi-Fi®, NearLink®, near-field communication (NFC), low-power wide-area network, ultra-wideband, Institutes of Electrical and Electronics Engineers (IEEE) 802.15, or similar. As such, device 150 may be a trusted device and classified as a "near the box" system relative to information handling system 135. In addition, physical devices or peripherals that are plugged in or associated with device 150 or other information handling systems that are physically or wirelessly connected to information handling system 135 via a short-range wireless connection may also be classified as "near the box" devices or information handling systems. This includes a webcam, keyboard, monitor, or other devices that are connected to information handling system 135 and/or device 150. These peripheral edge devices can also be configured with long-term storage for the machine learning or AI language model, such as language model 161.

FW/SW management service 152 may comprise any system, device, or apparatus configured to communicate with the relevant information handling system post-selection. For example, FW/SW management service 152 may interface with a device, component, or information handling system that will be leveraged on the device itself in order to run the AI workload. Accordingly, FW/SW management service 152 may be configured to receive an AI workload, run the AI workload locally, and then return the result to the source or display the result to the user. For example, FW/SW management service 152 may communicate via APIs to another information handling system, component, device, or to a cloud workload orchestrator, such as cloud workload orchestrator 184. In another example, FW/SW management service 152 may communicate with AI workload orchestrator 110.

GPU 154, which is similar to GPU 138, may comprise any system, device, or apparatus configured to process graphical or visual content and to communicate that content to a monitor or display where the content may be rendered. DNPU 158 may be similar to dNPU 140. Device 150 may include other AI processing units, also referred to as AI processors, similar to NPU 142, INPU 144, and AI processor 146. Memories 156 and 159 may be similar to memory 148. In one embodiment, memory 156 may be accessible by GPU 154 while memory 159 may be accessible by dNPU 158. However, GPU 154 and dNPU 158 may also be configured to share one memory.

Language model 161 may be a machine learning or AI language model, such as an SLM, LLM, or similar. Language model 161 may include multiple nodes and layers. Each node in a layer may have a connection to nodes in a subsequent layer, wherein each one has a weight. Language model 161 may be stored in one or memories 156 and 159. In addition, one of memories 156 and 159 may store an audit registry which can assist in the maintenance of language model 161. In one embodiment, the audit registry may include a record of audits performed on portions of language model 161 and/or the memory used to store the language model.

Because language models typically include several layers, the audit registry may indicate when a particular model and layer was last validated if at all, such as shown below in Table 1. For example, the audit registry may include a language model identifier, layer identifier, and when the language model identifier and layer identifier pair were last validated. The audit registry may also indicate a start and end of the storage location in the memory associated with the language model identifier and layer identifier, which can be available or discoverable by ECC validation service 117 and/or ECC service 157. The audit registry may also include audit information for binary data or a portion thereof associated with the language model or machine learning model in general, and wherein the binary data or portion thereof is stored in long term storage. The binary data or portion thereof may be used as a component of the language model or machine learning in generating an inference. Although the audit registry may be represented as a table shown below, the audit registry can be a two-dimensional data structure of other formats or a database.

TABLE 1

| Language Model Identifier | Layer Identifier | Last Validated | Start | End |
| --- | --- | --- | --- | --- |
| 0000 | 0000 | 2024 Aug. 18 | 0x00 | 0xFF |
| 0000 | 0001 | 0 | 0x100 | 0x1FF |
| 0000 | 0002 | 0 | 0x200 | 0x2FF |
| 0001 | 0000 | 2024 Aug. 18 | 0x100000 | 0x1000FF |
| 0001 | 0001 | 2024 Aug. 19 | 0x100100 | 0x1001FF |

ECC service 157 may comprise any system, device, or apparatus configured to provide information or a report to ECC validation service 117 of a language model or layer that has not been checked within a time threshold, such as a week, a month, etc. The threshold may be configurable by a system administrator or an ITDM. ECC service 157 may also be configured to run the ECC received from ECC validation service 117 against a portion of the language model. By running the ECC, ECC validation service 117 and/or ECC service 157 may be able to detect and correct an n-bit error. In one embodiment, ECC service 157 may be executed by a dedicated processor, GPU 154, dNPU 158, or similar.

Information handling system 160 can be a physical or virtual computing device that includes an FW/SW management service 152, a CPU 164, a GPU 166, a dNPU 168, and memories 170 and 172. Information handling system 160 may also be coupled to device 194 and dock 196, which is similar to device 105 and device 150 respectively. In one embodiment, distributed system environment 100 may include a trusted workgroup that is configured in a trusted peer network. The trusted workgroup may include information handling systems 135 and 160, and device 150, wherein these information handling systems and devices may be configured with AI services. As such, information handling system 160 may be a "trusted peer" of information handling system 135. Thus, information handling system 160 may be available to share AI workload 115 similar to device 150.

In this example, information handling system 160 may be deployed within a communication network but farther from information handling system 135 than device 150. For example, information handling systems 135 and 160 may be configured within a local area network. As such, information handling system 160 may be referred to as a "far from the box" system relative to information handling system 135. Accordingly, a computing device or information handling system that is configured within a local network similar to information handling system 160 may be deemed as far from the box relative to information handling system 135. For example, device 194 and dock 196 may also be deemed as far from the box.

FW/SW management service 162 may comprise any system, device, or apparatus configured with functionality that is similar to FW/SW management service 152. CPU 164 may comprise any system, device, or apparatus configured with functionality that is similar to CPU 136. GPU 166 may comprise any system, device, or apparatus configured with functionality that is similar to GPU 138. DNPU 168 may comprise any system, device, or apparatus configured with functionality that is similar to dNPU 140. INPU 174 may comprise any system, device, or apparatus configured with functionality that is similar to iNPU 144. Memories 170 and 172 may be configured similar to memory 148. In this example, memory 170 may be accessible by CPU 164 while memory 172 may be accessible by GPU 166. However, information handling system 160 may have more or less memories than shown. For example, information handling system 160 may have one memory that is accessible by CPU 164, GPU 166, dNPU 168, and iNPU 174.

Cloud data center 185 includes cloud gateway services 175, an information handling system 176, and an AI server 180. Cloud data center 185 may also include one or more racks that house information handling systems. In addition, other cloud data centers aside from cloud data center 185 may also be included as part of the cloud. In another embodiment, cloud gateway services 175 may be hosted by information handling system 176 or AI server 180. One or both of information handling system 176 and AI server 180 may be a physical or a virtual computing device. Cloud gateway services 175 includes an ECC storage 183, a cloud workload orchestrator 184, an ITDM portal 186, a workspace reservation data store 188, IT policy 182, applications 190 and 192, and weight storage 193. Applications 190 and 192 are applications installed remotely on cloud gateway service 175, also referred to as on-the-cloud (OTC) applications. These applications may be discrete application entities, or they may work in conjunction with OTB applications of information handling systems within the network, such as applications 102 and 104.

ECC storage 183 may comprise, any system, device, or apparatus configured to store ECCs that are accessible by one or more information handling systems and/or devices in distributed system environment 100. If an n-bit error is detected in a memory that is used to store language model 161, one or more of the ECCs stored in ECC storage 183 can be used to correct the bit error.

Cloud workload orchestrator 184 may comprise any system, device, or apparatus configured to run an AI workload on an available cloud computer, which can be in a private cloud, or a cloud computing platform based on an IT policy. ITDM portal 186 may comprise any system, device, or apparatus configured to allow an ITDM or a user to set policy on distributed system environment 100 as a whole, a set of information handling systems, or an individual information handling system. ITDM portal 186 also allows the ITDM to participate in the allocation of the information handling systems or resources in distributed system environment 100. In addition, ITDM portal 186 further allows the ITDM, user, or cloud workload orchestrator 184 to look up forthcoming workspace reservations and decide where a machine learning model, a deep learning model, an AI workload, or similar should be run.

Workspace reservation data store 188 may comprise any system, device, or apparatus configured to allow cloud gateway services 175 to store and retrieve data, such as workspace reservations. In one embodiment, workspace reservation data store 188 may be similar to data storage 108. For example, workspace reservation data store 188 may include a magnetic hard disk storage drive or a solid-state storage drive. In certain embodiments, workspace reservation data store 188 may be a cloud system of storage devices that is accessible via network. Further workspace reservation data store 188 may include a database or a collection of files that is a central repository of data associated with workspace reservations that are accessible by cloud workload orchestrator 184, ITDM portal 186, and/or applications 190 and 192. For example, cloud workload orchestrator 184 may retrieve, store, and utilize data stored in workspace reservation data store 188 via ITDM portal 186.

Weight storage 193 may comprise any system, device, or apparatus configured to store weights associated with language models, such as language model 161. During training, the language model learns and adjusts its weights which are used for each token to learn patterns and relationships. An n-bit error can affect the weights or code that interprets and executes said weights resulting in providing incorrect words as output. Accordingly, restoring the weights to their last known good values may correct the incorrect output. Another option to correct the output is to execute an ECC code to fix the n-bit error.

In modern enterprises, the term "hoteling," shared workspaces, or co-working spaces collectively refer to physical environments where clients, users, or employees can schedule their hourly, daily, or weekly use of individual spaces, such as office desks, cubicles, or conference rooms, thus serving as an alternative to conventional, permanently assigned seating. In some cases, hoteling clients, users, or employees access a reservation system to book an individual space, such as a desk, a cubicle, a conference room, an office, etc. before they arrive at work, which gives them the freedom and flexibility to work wherever they want to. Each workspace may include its own set of peripheral devices or components, such as displays, webcams, microphones, speakers, headsets, printers, etc. When a client, user, or employee reaches the workspace, they typically bring their individual information handling system, connect their information handling system to a dock or docking station, and integrate with the set of peripheral devices or components.

Shared workspaces and computer equipment can be pre-configured based on location or utility. In today's work from home environment, employees infrequently visit office buildings. Cubicles, desks, and their accompanying computer equipment are thus shared by different employees in a hoteling arrangement. An employee can typically reserve a workspace using a portal online to select the workspace based on various factors, such as building, team locality, hardware, and length of time for usage. An example of a workspace reservation is shown below:

```
{
"User": "FirstName_LastName",
"Start_Time": "2024 Aug. 30 13:00:00-05:00"
"End_Time": "2024 Aug. 30 18:00:00-5:00"
"Country": "United States",
"State": "Texas",
"City": "Austin",
"Office_Code": "12345-3-1"
"Workspace_Code": "PS3-2-134-1"
}
```

When the employee arrives at the cubicle, desk, or other workspace, the employee's smartphone and laptop computer may be provisioned via wired or wireless network, such as WI-FI®, BLUETOOTH®, and other wireless networks serving the workspace. For example, provisioning may include FW/SW management services 152 determining whether there is an upcoming workspace reservation and whether there is an AI workload to be processed associated with the workspace reservation. The processing of the AI workload can also be triggered when the employee logs in. The devices or information handling system associated with the workspace reservation may also be pre-provisioned prior to the employee logging in. As such, the AI workload can be processed before the employee logs in. This enables optimization of the AI workload offload procedure.

IT policy 182 may comprise an IT policy or a set of IT policies that may indicate whether a given AI workload is eligible for migration, for example, based upon contextual information indicative of a level of processing required for that workload (e.g., whether an offload allowed or not allowed based upon AI processing capability, location requirement, security requirement, etc.). In one example, IT policy 182 may be a global IT policy as shown below:

```
{
"IncludeCompute": ["CPU", "GPU", "NPU"],
"VideoWorkloads": "Disabled",
"AudioWorkloads": "Enabled",
"ExcludeDevicePattern": "Intel® iGPU*"
}
```

The above policy may enable the use of CPU, GPU, and NPU on the information handling systems included in distributed system environment 100 that the ITDM manages, such as information handling system 135 and 160, and device 150. According to this policy, video workloads would be disabled on the information handling systems and devices. However, this policy allows audio workloads. In this example, the IT policy would limit the use of the CPU, GPU, and NPU to clean up a meeting video but would allow the use of the CPU, GPU, and NPU to participate in cleaning up audio associated with the meeting. In addition, IT policies may also include audit thresholds, which indicate the frequency of validation for a section of a language model. The audit thresholds may also indicate the minimum time between audits for the language model, layer, memory, or other components associated with language model 161.

In general, computer networks are considered to be trusted according to some rules, such as: a) by default, provisioned information handling systems under the purview of an organization's information technology (IT) department are trusted by each other for many corporate information handling system users, and b) by default, multiple systems registered with the same account are considered to be trusted for non-corporate users. IT administrators have the ability to create smaller groups within their organization, such as engineering computing devices, workstations, etc. to trust other engineering computing devices or workstations, according to the organization's policy. For example, IT policy 182 may be configured as an engineering system group policy for a specific set or group of information handling systems as shown below:

```
{
"LocalWorkloads": {
"Never":
{"ApplicationList": ["Visual Studio®", "Creo®"]
},
"NPUAvailable": {
"ApplicationList": ["Teams®", "Zoom®",
"VSCode®"]
}
}
}
```

The above policy may apply to a set or group of information handling systems in an engineering domain that an ITDM manages. This policy may be configured to control when an AI workload can be run locally in one or more information handling systems in the engineering domain. In this example, local AI workloads may not be run locally if an end user is running a Visual Studio® or Creo® application. On the other hand, if the end-user is running Teams®, Zoom®, or VSCode®, then local AI workloads may run when there is a local NPU available.

In various embodiments, distributed system environment 100 may not include each of the components shown in FIG. 1. Additionally, or alternatively, distributed system environment 100 may include various additional components to those shown in FIG. 1. Furthermore, some components that are represented as separate components in FIG. 1 may in certain embodiments be integrated with other components. For example, in certain embodiments, all or a portion of the illustrated components may instead be provided by components integrated into one or more processors, such as a SOC.

FIG. 1 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, a user may connect information handling system 135 to device 150 and/or a peripheral device. In this example, information handling system 135 may be a client computing device of the user, such as a laptop or a notebook. ECC validation service 117 may initiate a connection to device 150 via FW/SW management services 152 when information handling system 135 docks into device 150. At this point, a notification may ask the user whether he or she wants to opt-in for validating portions of language model 161. In another embodiment, the user or the ITDM may have already opted in to have portions of the language model be validated every time the user connects to device 150. When the user opts in for the validation, then the operations may proceed to stage B.

At stage B, ECC validation service 117 may inspect an audit registry of language model 161, such as Table 1 depicted above. The audit registry includes information associated with audits performed for portions of protected language model 161 or the memory that stores language model 161. For example, ECC validation service '117 may query the audit registry via ECC service 157. The query may request information on when the language model or portions thereof were last audited. In another embodiment, the inspection of the audit registry may be performed by ECC service 157 instead.

At stage C, ECC service 157 may provide the information requested by ECC validation service 117. For example, ECC service 157 may provide ECC validation service 117 the information via a sideband channel of an embedded controller. ECC validation service 117 may determine whether to perform an audit. In one embodiment, ECC validation service 117 may perform an audit of sections of language model 161 that have not been audited or have exceeded its audit threshold. The audit threshold may be included in an IT policy, such as IT policy 182.

At stage D, when ECC validation service 117 determines to perform an audit, ECC validation service 117 may query ECC storage 183 for an ECC associated with language model 161 or portions thereof. For example, ECC validation service 117 may transmit an API request for an ECC that corresponds to the language model identifier and layer identifier to be audited. In another embodiment, ECC service 157 may query ECC storage 183 for the ECC associated with language model 161 or portions thereof. As such, operations performed by the various stages shown herein may be performed exclusively by one or more components of device 150 with cloud gateway services 175 or its components without intervention or assistance from device 105.

At stage E, ECC validation service 117 may provide the retrieved ECC to ECC service 157 of device 150. ECC service 157 may apply the ECC to the relevant protected portion of language model 161. In one example, the ECC service may apply the ECC via an embedded controller sideband connection. The protected portion of language model 161 is one or more portions of language model 161 that are audited periodically. In another embodiment, the entire language model 161 may be protected. An ITDM may determine whether to protect one or more portions of language model 161 or the entire language model 161. In one embodiment, the ECC may be configured to detect and fix errors, such as data corruption associated with one or more tokens and/or weights of the machine learning model or language model. For example, ECC validation service 117 may determine that values of the tokens and/or weights associated with language model 161 or a portion thereof are incorrect.

The ECC may be configured to fix the values of the tokens and/or weight, such as by correcting one or more bits associated with the incorrect values. For example, the ECC may include error correction data to fix the incorrect values. In other instances, the ECC may not be able to successfully fix the detected error. For example, the size of the portion of the language model with errors and/or a number of incorrect values exceeds a threshold. In certain instances, the ECC may not be configured to correct the detected errors. At this point, ECC validation service 117 with ECC service 157 may request a set of weights associated with language model 161 or a portion thereof. For example, ECC validation service 117 with ECC service 157 may determine to request for a set of tokens and/or weights of a particular section or layer of language model 161.

In another embodiment, the ECC may be configured to detect and correct n-bit errors associated with memory used to store the language model. For example, the ECC may allow single-bit error, which would normally cause a parity error to be detected and corrected. Similar to above, there may be instances where the ECC may not be configured to fix n-bit errors or the number of bit errors exceeds a threshold. At this point, ECC validation service 117 with ECC service 157 may request a set of weights associated with a portion of language model 161 with the bit errors to overwrite current set of weights stored in the memory.

At stage F-1, ECC validation service 117 may transmit a request to cloud workload orchestrator 184 to retrieve or download a set of weights associated with the language model or a portion thereof. For example, the request may include a query for weights associated with a language model identifier and layer identifier. At stage F-2, ECC validation service 117 may provide the downloaded weights to ECC service 157 which may then overwrite corresponding weights stored in the memory with the downloaded weights. This may update the weights to correct values or last known good values.

At stage G, ECC validation service 117 may notify ITDM portal 186 of the audit performed and/or the status of detected errors if any. For example, ECC validation service 117 may report to ITDM portal 186 whether the ECC detected and/or fixed the detected errors. ECC validation service 117 may also provide a report regarding the downloaded weights. For example, ECC validation service 117 may provide the language model identifier and layer identifier associated with the downloaded weights. In addition, ECC validation service 117 and/or ECC service 157 may update the validation date in the audit registry. For example, an entry in the last validated column of Table 1 associated with the language model identifier and layer identifier may be updated.

Although the examples herein show operations between information handling system 135, which is a client computing system, and device 150, which is a docking station, one of skill in the art will appreciate that the operations may be performed between a client computing system and a peripheral device, such as a smart webcam, wherein the webcam may have a memory to store a language model and a processor to execute the operations. In addition, although the examples herein depict a language model, one of skill in the art will appreciate that the present disclosure may be applicable to artificial intelligence models, deep learning models, machine learning models, or similar. For example, the present disclosure may use the ECC to detect and/or repair errors associated with a vision machine learning model of a camera, an audio processing model of a microphone, or similar. Vision machine learning models may be used for user identification, user focus, image, correction, etc. Audio machine learning models may be used to clean audio streams.

Those of ordinary skill in the art will appreciate that the configuration, hardware, and/or software components of distributed system environment 100 depicted in FIG. 1 may vary. For example, the illustrative components within distributed system environment 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
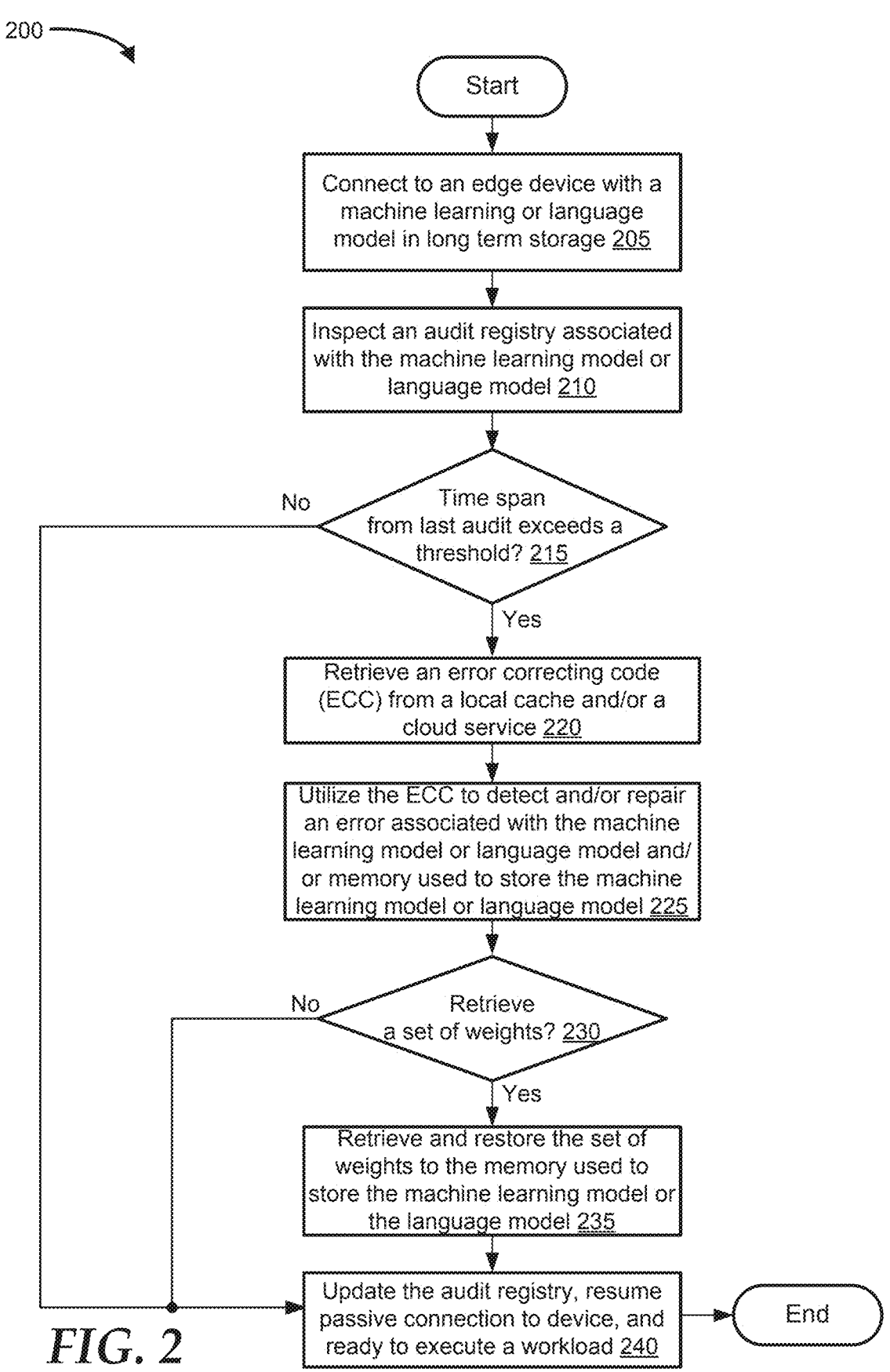
FIG. 2 is a flowchart of a method for distributed error correction code for edge device machine learning models, according to an embodiment of the present disclosure.

FIG. 2 illustrates a method 200 for the distribution of an error correction code for edge peripheral device machine learning models, according to an embodiment of the present disclosure. Method 200 may be performed by any suitable component of distributed system environment 100 of FIG. 1 including, but not limited to, ECC validation service 117 and ECC service 157 of FIG. 1. While embodiments of the present disclosure are described in terms of the components of distributed system environment 100 of FIG., it should be recognized that other components may be utilized to perform the described method. One of skill in the art will appreciate that this flow chart explains a typical example, which can be extended to applications or services in practice. It will be readily appreciated that not every method step set forth in this flow chart is always necessary and that certain steps of the methods may be combined, performed simultaneously, in a different order, or perhaps omitted, without varying from the scope of the disclosure.

Method 200 typically starts at block 205 where a client computing system, such as information handling system 135 of FIG. 1, detects a connection to a peripheral device or a docking station, such as device 150, wherein the peripheral device or the docking station includes a language model in storage. The peripheral device may also be connected to the docking station, wherein the peripheral device and the docking station are edge devices of a distributed system that is similar to distributed system environment 100 of FIG. 1. The connection may be made physically or wirelessly. The method may proceed to block 210.

At block 210, an ECC validation service, which is similar to ECC validation service 117 of FIG. 1, may inspect an audit registry associated with the peripheral device or the docking station, similar to Table 1. For example, the ECC validation service may check if any one of the machine learning model or language model and layer identifier pairs has not yet been validated or validated last. If all of the machine learning model or language model and layer pairs have been validated, then the ECC validation service may check last or latest audit dates of each of the protected memory portions of the machine learning model or language model and layer pairs to determine which pair was audited last. The ECC validation service may determine a time span from a current date or time stamp to the audit date of the pairs that were audited last. In one example, if a pair has not been validated, then an entry for the last validated column may be null and the time span between the null entry and the current date may be equal to the threshold plus one day. The method may proceed to decision block 215.

At decision block 215, the ECC validation service may determine whether there is at least one particular machine learning model or language model and layer pair that has not been audited within a time period. In other words, the ECC validation service may determine whether the time span from the last audit to the current date or time stamp is greater than an audit threshold. For example, if the audit threshold is monthly, if a portion of the machine learning model or language model has been audited more than a month before, then the last audit date may be deemed to have exceeded the audit threshold. If the time span from the last audit exceeds the audit threshold, then a "YES" branch is taken, and the method may proceed to block 220. If the time span from the last audit does not exceed a threshold, then a "NO" branch is taken, and the method may end.

At block 220, the ECC validation service may retrieve an ECC from an ECC storage of a local cache when available. Otherwise, the ECC validation service may retrieve the ECC from an ECC storage of a cloud gateway service, such as cloud gateway services 175 of FIG. 1. For example, the ECC request may determine whether there is a local reference for the ECC in a cache storage. If available, then the ECC validation service may utilize the ECC from the cache. If not available locally, then the ECC validation service may transmit a request for the ECC to the cloud gateway service via an application programming interface (API) call. The request may include the machine learning model identifier or language model identifier and layer identifier. As such the ECC to be retrieved may be specific to the language model and layer. The ECC may be utilized to execute against relevant tokens and/or parameters, such as weights of the machine learning model or language model. This allows the ECC to detect and correct data corruption in the machine learning model or language model.

In one embodiment, the ECC may detect a difference in one or more values of the tokens and/or the weights using a hash or checksum algorithm on a set of tokens and/or weights of the machine learning model or language model. In particular, checksums may be calculated from a clean version of the set of tokens and/or weights of portion(s) of the language model and compared with current checksums. The ECC may update one or more bits associated with the incorrect values of the tokens and/or the weights to fix the incorrect values. In another embodiment, the ECC may be utilized to detect and correct n-bit data corruption in the memory that stores the machine learning model or language model. In one example, the ECC may calculate hash values associated with a memory block that stores the machine learning model or language model. The calculated hash values may then be compared to known hash value for that memory block. A discrepancy between hash values may indicate a memory corruption, which the ECC may be configured to fix. The ECC may include linear error correction codes, such as Hamming codes. The ECC may include Bose-Chaudhuri-Hocquenghem (BCH) codes, linear network coding, Reed-Solomon error correction, low-density parity check codes, turbo codes, raptor codes, repetition codes, or similar.

At block 225, the ECC validation service may provide the ECC to an ECC service of the peripheral device or docking station, such as ECC service 157 of FIG. 1 via an embedded controller of the client computing system. The embedded controller may communicate with another embedded controller of the peripheral device or docking station. This embedded controller may then communicate with ECC service 157. The ECC may be utilized to scan one or more portions of the machine learning model or language model and detect and fix errors associated with a set of tokens and/or weights if any. As such, the ECC may scan a tokenizer associated with the set of tokens, wherein the tokenizer may be in a long term storage of the peripheral device. Further, the EC may scan a binary code or a portion thereof that is used as a component of the machine learning model. The ECC may also be utilized to scan the memory or portion thereof of the peripheral device or the docking station that stores the machine learning model or language model. The scan may be performed by the ECC to detect and/or correct n-bit data corruption if any in the memory. The method may proceed to decision block 230.

At decision block 230, the ECC validation service and/or the ECC service may determine whether to retrieve a set of weights associated with the machine learning model or language model. In certain instances, the ECC may not be capable of correcting the detected error. As such, the set of weights may be retrieved from a data store at a cloud service. The cloud service may be hosted by a manufacturer of the information handling system, peripheral device, or developer of an application associated with the machine learning model or language model. If the ECC validation service and/or the ECC service determines to retrieve a set of weights associated with the machine learning model or language model, then the "YES" branch is taken, and the method may proceed to block 235. If the ECC validation service and/or the ECC service determine not to retrieve a set of weights associated with the machine learning model or language model, then the "NO" branch is taken the method may end.

At block 235, the ECC validation service of the information handling system may cooperate with the ECC service of the peripheral device or docking station to request at least one set of weights from the local cache, or a data store maintained by the cloud service. The weights retrieved may be associated with a language model identifier and a layer identifier with the detected error. The retrieved weights may be used to correct the error by replacing weights currently stored in the memory. As such, the retrieved weights may be restored in the region of the memory where the error is detected. As the weights of the machine learning model or language model may be fine-tuned periodically, the retrieved weights may be the last known good weights associated with the particular language model and layer. The method may proceed to block 240.

At block 240, the ECC validation service may update the audit registry. In a particular example, the ECC validation service may update the last validated column, such as depicted in Table 1. The information handling system may continue with a passive connection with the edge device and be ready to service or execute a workload. Afterwards, the method ends.

FIG. 3 illustrates an embodiment of an information handling system 300 including processors 302 and 304, a chipset 310, a memory 320, a graphics adapter 330 connected to a video display 334, a non-volatile RAM (NVRAM) 340 that includes a basic input and output system/extensible firmware interface (BIOS/EFI) module 342, a disk controller 350, a hard disk drive (HDD) 354, an optical disk drive (ODD) 356, a disk emulator 360 connected to a solid-state drive (SSD) 364, an I/O interface 370 connected to an add-on resource 374 and a trusted platform module (TPM) 376, a network interface 380, and a BMC 390. Processor 302 is connected to chipset 310 via processor interface 306, and processor 304 is connected to the chipset via processor interface 308. In a particular embodiment, processors 302 and 304 are connected together via a high-capacity coherent fabric, such as a HyperTransport link, a QuickPath Interconnect, or the like. Chipset 310 represents an integrated circuit or group of integrated circuits that manage the data flow between processors 302 and 304 and the other elements of information handling system 300. In a particular embodiment, chipset 310 represents a pair of integrated circuits, such as a northbridge component and a southbridge component. In another embodiment, some or all of the functions and features of chipset 310 are integrated with one or more of processors 302 and 304.

Memory 320 is connected to chipset 310 via a memory interface 322. An example of memory interface 322 includes a DDR memory channel and memory 320 represents one or more DDR DIMMs. In a particular embodiment, memory interface 322 represents two or more DDR channels. In another embodiment, one or more of processors 302 and 304 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 320 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 330 is connected to chipset 310 via a graphics interface 332 and provides a video display output 336 to a video display 334. An example of a graphics interface 332 includes a PCIe interface and graphics adapter 330 can include a four-lane (x4) PCIe adapter, an eight-lane (x8) PCIe adapter, a 16-lane (x16) PCIe adapter, or another configuration, as needed or desired. In a particular embodiment, graphics adapter 330 is provided down on a PCB. Video display output 336 can include a Digital Video Interface (DVI), a High-Definition Multimedia Interface (HDMI), a DisplayPort interface, or the like, and video display 334 can include a monitor, a smart television, an embedded display such as a laptop computer display, or the like.

NVRAM 340, disk controller 350, and I/O interface 370 are connected to chipset 310 via an I/O channel 312. An example of I/O channel 312 includes one or more point-to-point PCIe links between chipset 310 and each of NVRAM 340, disk controller 350, and I/O interface 370. Chipset 310 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface, a Universal Serial Bus (USB), another interface, or a combination thereof. NVRAM 340 includes BIOS/EFI module 342 that stores machine-executable code (BIOS/EFI code) that operates to detect the resources of information handling system 300, to provide drivers for the resources, to initialize the resources, and to provide common access mechanisms for the resources. The functions and features of BIOS/EFI module 342 will be further described below.

Disk controller 350 includes a disk interface 352 that connects the disc controller to a hard disk drive (HDD) 354, to ODD 356, and to disk emulator 360. An example of disk interface 352 includes an Integrated Drive Electronics (IDE) interface, an Advanced Technology Attachment (ATA) such as a parallel ATA (PATA) interface or a SATA interface, a SCSI interface, a USB interface, a proprietary interface, or a combination thereof. Disk emulator 360 permits SSD 364 to be connected to information handling system 300 via an external interface 362. An example of external interface 362 includes a USB interface, an institute of electrical and electronics engineers (IEEE) 1394 (Firewire) interface, a proprietary interface, or a combination thereof. Alternatively, SSD 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312 or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral interface 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board, or add-in card disposed within information handling system 300, a device that is external to the information handling system, or a combination thereof.

Network interface 380 represents a network communication device disposed within information handling system 300, on a main circuit board of the information handling system, integrated onto another component such as chipset 310, in another suitable location, or a combination thereof. Network interface 380 includes a network channel 382 that provides an interface to devices that are external to information handling system 300. In a particular embodiment, network channel 382 is of a different type than peripheral interface 372 and network interface 380 translates information from a format suitable to the peripheral channel to a format suitable to external devices.

In a particular embodiment, network interface 380 includes a NIC or host bus adapter (HBA), and an example of network channel 382 includes an InfiniBand channel, a Fibre Channel, a Gigabit Ethernet channel, a proprietary channel architecture, or a combination thereof. In another embodiment, network interface 380 includes a wireless communication interface, and network channel 382 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 382 can be connected to an external network resource (not illustrated). The network resource can include another information handling system, a data storage system, another network, a grid management system, another suitable resource, or a combination thereof.

BMC 390 is connected to multiple elements of information handling system 300 via one or more management interface 392 to provide out-of-band monitoring, maintenance, and control of the elements of the information handling system. As such, BMC 390 represents a processing device different from processor 302 and processor 304, which provides various management functions for information handling system 300. For example, BMC 390 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 390 can vary considerably based on the type of information handling system. BMC 390 can operate in accordance with an Intelligent Platform Management Interface (IPMI). Examples of BMC 390 include an Integrated Dell® Remote Access Controller (IDRAC).

Management interface 392 represents one or more out-of-band communication interfaces between BMC 390 and the elements of information handling system 300 and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 300, that is apart from the execution of code by processors 302 and 304 and procedures that are implemented on the information handling system in response to the executed code.

BMC 390 operates to monitor and maintain system firmware, such as code stored in BIOS/EFI module 342, option ROMs for graphics adapter 330, disk controller 350, add-on resource 374, network interface 380, or other elements of information handling system 300, as needed or desired. In particular, BMC 390 includes a network interface 394 that can be connected to a remote management system to receive firmware updates, as needed or desired. Here, BMC 390 receives the firmware updates, stores the updates to a data storage device associated with the BMC, and transfers the firmware updates to NVRAM 340 of the device or system that is the subject of the firmware update, thereby replacing the currently operating firmware associated with the device or system, and reboots information handling system, whereupon the device or system utilizes the updated firmware image.

BMC 390 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 390, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 390 is included on a main circuit board (such as a baseboard, a motherboard, or any combination thereof) of information handling system 300 or is integrated onto another element of the information handling system such as chipset 310, or another suitable element, as needed or desired. As such, BMC 390 can be part of an integrated circuit or a chipset within information handling system 300. An example of BMC 390 includes an iDRAC, or the like. BMC 390 may operate on a separate power plane from other resources in information handling system 300. Thus BMC 390 can communicate with the management system via network interface 394 while the resources of information handling system 300 are powered off. Here, information can be sent from the management system to BMC 390 and the information can be stored in a RAM or NVRAM associated with the BMC. Information stored in the RAM may be lost after power-down of the power plane for BMC 390, while information stored in the NVRAM may be saved through a power-down/power-up cycle of the power plane for the BMC.

Information handling system 300 can include additional components and additional buses, not shown for clarity. For example, information handling system 300 can include multiple processor cores, audio devices, and the like. While a particular arrangement of bus technologies and interconnections is illustrated for the purpose of example, one of skill will appreciate that the techniques disclosed herein are applicable to other system architectures. Information handling system 300 can include multiple CPUs and redundant bus controllers. One or more components can be integrated together. Information handling system 300 can include additional buses and bus protocols, for example, I2C and the like. Additional components of information handling system 300 can include one or more storage devices that can store machine-executable code, one or more communications ports for communicating with external devices, and various input and output (I/O) devices, such as a keyboard, a mouse, and a video display.

For purposes of this disclosure, information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as processor 302, a programmable logic array (PLA), an embedded device such as a System-on-a-Chip (SoC), or other control logic hardware. Information handling system 300 can also include one or more computer-readable media for storing machine-executable code, such as software or data.

Although FIG. 2 shows example blocks of method 200 in some implementations, method 200 may include additional blocks, fewer blocks, different blocks, or differently arranged blocks than those depicted in FIG. 2. Those skilled in the art will understand that the principles presented herein may be implemented in any suitably arranged processing system. Additionally, or alternatively, two or more of the blocks of method 200 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
in response to connecting to an edge device, determining, by a processor, a last audit date of a language model;
determining whether the last audit date exceeds an audit threshold; and
in response to determining that the last audit date exceeds the audit threshold, applying an error correction code to the language model.

2. The method of claim 1, wherein the last audit date is based on an audit registry associated with the language model.

3. The method of claim 1, further comprising downloading a set of weights associated with the language model.

4. The method of claim 3, further comprising overwriting current weights in memory with the set of weights.

5. The method of claim 3, wherein the set of weights is stored in a cloud data store.

6. The method of claim 1, further comprising using the error correction code in detecting an error associated with the language model.

7. The method of claim 6, further comprising using the error correction code in correcting the error.

8. The method of claim 1, wherein the error correction code is stored in a cloud data store.

9. An information handling system, comprising:
a processor; and
a memory coupled to the processor, the memory having program instructions stored thereon that, upon execution cause the processor to:

in response to detecting a connection to an edge device, determine, a last audit date of a machine learning model;
determine whether the last audit date exceeds an audit threshold; and
in response to a determination that the last audit date exceeds the audit threshold, apply an error correction code to the machine learning model.

10. The information handling system of claim 9, wherein the last audit date is based on an audit registry associated with the machine learning model.

11. The information handling system of claim 9, wherein the execution further causes the processor to download a set of weights associated with the machine learning model.

12. The information handling system of claim 11, wherein the execution further causes the processor to overwrite current weights in another memory with the set of weights.

13. The information handling system of claim 11, wherein the set of weights is stored in a cloud data store.

14. A non-transitory computer-readable medium to store instructions that are executable to perform operations comprising:
in response to connecting to an edge device, determining a last audit date of a language model;
determining whether the last audit date exceeds an audit threshold; and
in response to determining that the last audit date exceeds the audit threshold, applying an error correction code to the language model.

15. The non-transitory computer-readable medium of claim 14, wherein the last audit date is based on an audit registry associated with the language model.

16. The non-transitory computer-readable medium of claim 14, wherein the operations further comprise downloading a set of weights associated with the language model.

17. The non-transitory computer-readable medium of claim 16, wherein the operations further comprise overwriting current weights in memory with the set of weights.

18. The non-transitory computer-readable medium of claim 16, wherein the set of weights is stored in a cloud data store.

19. The non-transitory computer-readable medium of claim 14, wherein the operations further comprise using the error correction code in detecting an error associated with the language model.

20. The non-transitory computer-readable medium of claim 19, wherein the operations further comprise using the error correction code in correcting the error.

* * * * *